United States Patent
Merino Vazquez et al.

(10) Patent No.: US 12,490,073 B2
(45) Date of Patent: Dec. 2, 2025

(54) COMMON EVENT EXPOSURE IN NETWORK DOMAINS

(71) Applicant: Telefonaktiebolaget LM Ericsson (publ), Stockholm (SE)

(72) Inventors: Emiliano Merino Vazquez, Madrid (ES); Beatriz Maroto Gil, Majadahonda Madrid (ES); Jingrui Tao, Guangzhou (CN); Ping Chen, Shanghai (CN); Cristina Ruiz Balmaseda, Las Matas (ES); David Castellanos Zamora, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 437 days.

(21) Appl. No.: 17/917,660

(22) PCT Filed: Mar. 30, 2021

(86) PCT No.: PCT/EP2021/058311
§ 371 (c)(1),
(2) Date: Oct. 7, 2022

(87) PCT Pub. No.: WO2021/204598
PCT Pub. Date: Oct. 14, 2021

(65) Prior Publication Data
US 2023/0156453 A1 May 18, 2023

(30) Foreign Application Priority Data
Apr. 8, 2020 (WO) ................ PCT/CN2020/083796

(51) Int. Cl.
*H04W 8/02* (2009.01)
*H04W 4/70* (2018.01)
*H04W 88/14* (2009.01)

(52) U.S. Cl.
CPC ................ *H04W 8/02* (2013.01); *H04W 4/70* (2018.02); *H04W 88/14* (2013.01)

(58) Field of Classification Search
CPC .......... H04W 8/02; H04W 4/70; H04W 88/14
(Continued)

(56) References Cited

U.S. PATENT DOCUMENTS

2018/0262941 A1* 9/2018 Huang ............. H04W 28/0221
2018/0270710 A1 9/2018 Hua et al.
(Continued)

FOREIGN PATENT DOCUMENTS

| WO | 2020001402 A1 | 1/2020 |
| WO | 2020029670 A1 | 2/2020 |
| WO | 2020038282 A1 | 2/2020 |

OTHER PUBLICATIONS

Office Action for Japanese Patent Application No. 2022-550237, including English summary, dated Jul. 24, 2023, 4 pages.
(Continued)

*Primary Examiner* — Mark G. Pannell
(74) *Attorney, Agent, or Firm* — Sage Patent Group

(57) ABSTRACT

A method performed by performed by an exposure node having a first identity in a first network domain in a telecommunications network is provided. The method includes initiating a request towards a first network node for a subscription to an event of a communication device. The request includes subscription information for a common network exposure in at least two network domains. The method further includes receiving a response from the first network node. The response includes at least one of: a first confirmation that the event will be reported to the exposure node for a second network domain for the common network exposure and a second confirmation that the event will be reported to the exposure node for the first network domain.

(Continued)

The second confirmation omits an indication of the common network exposure. Methods performed by a first network node are also provided.

12 Claims, 10 Drawing Sheets

(58) Field of Classification Search
USPC .................................................. 455/414.1
See application file for complete search history.

(56) References Cited

U.S. PATENT DOCUMENTS

| | | | |
|---|---|---|---|
| 2018/0324652 A1* | 11/2018 | Ryu | H04W 36/08 |
| 2021/0022101 A1* | 1/2021 | Zhu | H04W 4/60 |
| 2021/0112462 A1 | 4/2021 | Zhu et al. | |
| 2021/0250344 A1* | 8/2021 | Qi | H04W 12/06 |
| 2021/0274392 A1* | 9/2021 | Dao | H04W 36/0033 |
| 2021/0274575 A1* | 9/2021 | Talebi Fard | H04W 76/12 |
| 2022/0191665 A1* | 6/2022 | Hong | H04W 4/60 |

OTHER PUBLICATIONS

Huawei et al., "Solution for KI#9 common north-bound APIs for EPC-5GC interworking," S2-183982, 3GPP TSG SA WG2 Meeting #127, Apr. 16-20, 2018, Sanya, China, 7 pages.
Convida Wireless LLC et al., "Concluding Key Issue #9," S2-187216, 3GPP TSG SA WG2 Meeting #128, Jul. 2-6, 2018, Vilnius, Lithuania, 11 pages.
International Search Report and Written Opinion of the International Searching Authority for PCT International Application No. PCT/EP2021/058311 dated Jul. 6, 2021.
3GPP TS 23.501 V16.2.0, "3rd Generation Partnership Project; Technical Specification Group Services and System Aspects; System Architecture for the 5G System (5GS); Stage 2 (Release 16)," Sep. 2019, 391 pages.
3GPP TR 23.724 V16.1.0, "3rd Generation Partnership Project; Technical Specification Group Services and System Aspects; Study on Cellular Internet of Things (CIoT) support and evolution for the 5G System (5GS) (Release 16)," Jun. 2019, 274 pages.
3GPP TS 29.336 V16.1.0, "3rd Generation Partnership Project; Technical Specification Group Core Network and Terminals; Home Subscriber Server (HSS) diameter interfaces for interworking with packet data networks and applications (Release 16)," Dec. 2019, 78 pages.
3GPP TS 29.503 V16.2.0, "3rd Generation Partnership Project; Technical Specification Group Core Network and Terminals; 5G System; Unified Data Management Services; Stage 3 (Release 16)," Dec. 2019, 280 pages.
3GPP TS 23.501 V16.3.0, "3rd Generation Partnership Project; Technical Specification Group Services and System Aspects; System architecture for the 5G System (5GS); Stage 2 (Release 16)," Dec. 2019, 417 pages.
International Preliminary Report on Patentability for PCT International Application No. PCT/EP2021/058311 dated Jun. 23, 2022.
Written Opinion of the International Preliminary Examining Authority for PCT International Application No. PCT/EP2021/058311 dated Mar. 31, 2022.
Ericsson, "Common Network Exposure," C4-202120, 3GPP TSG-CT WG4 Meeting #97e, E-Meeting, Apr. 15-24, 2020, 9 pages.
Japanese Notice of Allowance and English Translation, Japanese Patent Application No. 2023-213983, mailed Apr. 24, 2025, 6 pages.
3GPP TSG-SA WG2 Meeting #130, Procedures for solution 14 to key issue 9, S2-1900594, Huawei, HiSilicon, Jan. 21-25, 2019, Kochi, India, 9 pages.
3GPP TSG-SA WG2 Meeting #132, Support of EPC interworking for CIoT Monitoring Events, 3GPP TSG-SA WG2 Meeting #132, S2-1903953, Xi'an, People's Republic of China, Apr. 8-12, 2019, 3 pages.
Indian Office Action, Indian Patent Application No. 202217048602, mailed Sep. 9, 2025, 8 pages.

* cited by examiner

US 12,490,073 B2

COMMON EVENT EXPOSURE IN NETWORK DOMAINS

CROSS-REFERENCE TO RELATED APPLICATIONS

This application is a 35 U.S.C. § 371 national stage application of PCT International Application No. PCT/EP2021/058311 filed Mar. 30, 2021, which claims the benefit of PCT Application No. PCT/CN2020/083796 filed Apr. 8, 2020, the contents of which are hereby incorporated by reference herein.

TECHNICAL FIELD

The present disclosure relates generally to wireless communications systems and, more particularly, to common event exposure in at least two network domains (e.g., 4G and 5G).

BACKGROUND

Cellular Internet of Things (CIoT) is a technology which involves Machine-Type Communication devices (MTC device) so that a telecommunications operator may provide other parties/companies its network for different applications.

An example of such applications is the use of smart-metering readers, in which a MTC device can be placed in different locations and start sending and receiving data on a regular basis (e.g. electricity consumption reports, water-levels, etc.). A hiring car company is another example, since the company can place a MTC device on each car to track the consumers/customers and send them, e.g., local advertising whenever they pass through a certain location.

SUMMARY

According to various embodiments of inventive concepts, a method performed by an exposure node having a first identity in a first network domain in a telecommunications network is provided. The method includes initiating a request towards a first network node for a subscription to an event of a communication device. The request includes subscription information for a reporting on the event including an indication of a common network exposure in at least two network domains. The at least two network domains include the first network domain that the first network node belongs to and at least one additional network domain. The subscription information further includes a second identity of the exposure node for the reporting on the event for the at least one additional second network domain. The method further includes, responsive to the request, receiving a response from the first network node. The response includes at least one of: a first confirmation that the event will be reported to the exposure node for the second network domain for the common network exposure and a second confirmation that the event will be reported to the exposure node for the first network domain. The second confirmation omits an indication of the common network exposure.

In some embodiments, further operations performed by the exposure node include, subsequent to receiving the first confirmation, receiving a notification of the event from each of a second network node and a third network node for each of the at least two network domains, respectively.

In some embodiments, further operations performed by the exposure node include, subsequent to receiving only the second confirmation, initiating the subscription towards a fourth network node for reporting the event by a second network node for the second network domain.

Corresponding embodiments of inventive concepts for an exposure node, computer products, and computer programs are also provided.

According to other embodiments of inventive concepts, a method performed by a first network node in a telecommunications network is provided. The method includes receiving a request from an exposure node for a subscription to an event of a communication device. The request includes an indication of a common network exposure in at least a second network domain for a reporting on the event and an identity of the exposure node for the reporting on the event for the second network domain. The method further includes checking for a fourth network node in the telecommunications network that provides a common event exposure service.

In some embodiments, further operations performed by the first network node include storing the subscription information.

In some embodiments, further operations performed by the first network node include identifying a fourth network node in the telecommunications network that provides a common event exposure service. The method further includes initiating at least one request towards a fourth network node for: a subscription to the fourth network node via the common event exposure service produced by the second network node and to monitor an event of a communication device. The method further includes responsive to the at least one request, receiving a response from the fourth network node including an indication that a combined network node successfully accepted the subscription and is monitoring the event.

In some embodiments, further operations performed by the first network node include, responsive to the request, initiating a response to the exposure node. The response includes at least one of: a first indication that the event is being monitored in one of the at least two network domains and a second indication that the event is accepted in the second network domain.

Corresponding embodiments of inventive concepts for a first network node, computer products, and computer programs are also provided.

When a home subscriber server (HSS) and a unified data management (UDM) node in a telecommunications network are not co-located, one approach for reporting events by a serving node for a communication device to a exposure node for two network domains (e.g., 4G and 5G) may be to send event subscription to both the HSS and UDM so that regardless of where the communication device is camping (e.g., 4G/Evolved Packet System (EPS) or 5GC), the event may be detected and reported.

Such an approach may not be efficient from a network perspective, and may result in slow evolution and modernization of an operator's network.

Various embodiments of the present disclosure may provide solutions to these and other potential problems. In various embodiments of the present disclosure, an exposure node and additional network nodes operate to provide a method for common network exposure in deployments where a HSS and UDM may not combined. As a consequence, duplication of subscriptions from the exposure node may be avoided and the network may evolve more efficiently.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
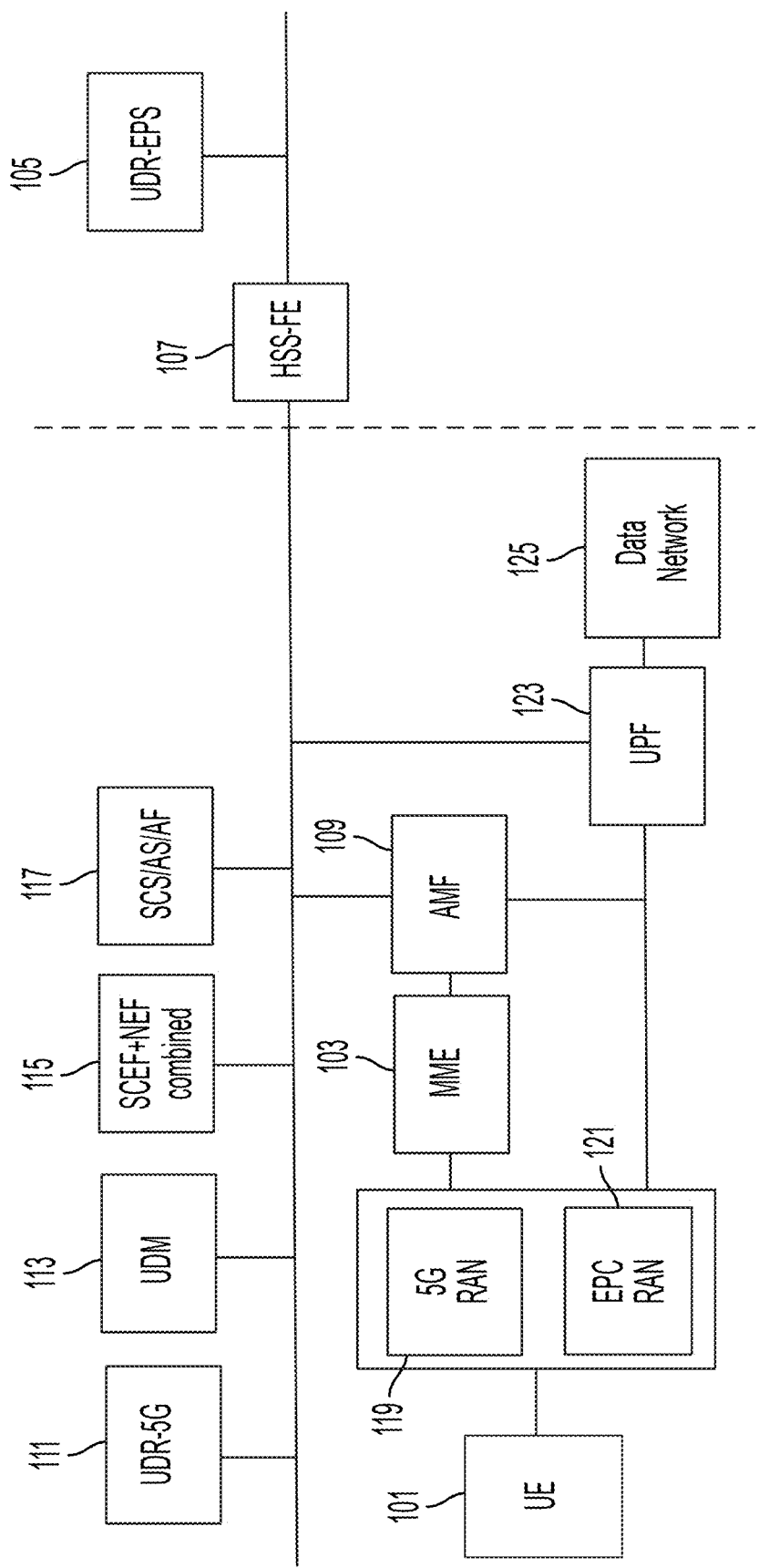
FIG. 1 illustrates a telecommunications network in accordance with various embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The term "exposure function (EF)" (also referred to herein as an exposure node) is used in a non-limiting manner and, as explained below, can refer to any functional entity (network function/node) that can receive the configuration of different monitoring events (e.g. when a MTC device becomes reachable) initiated by an Application Function (AF) (also referred to herein as an application node). The terms "exposure function" herein may be interchangeable and replaced with the term "EF", "exposure node", "EF node", "service capabilities exposure node (SCEF)", "network exposure node (NEF)", and/or SCEF+NEF combined node. The monitoring can be sent by the EF node via a HSS towards a mobility management entity (MME) (also referred to herein as an MME node) in 4G Core via diameter protocol (e.g., s6t interface, as described in 3GPP TS 29.336, Rel. 16.1.0, (3 Mar. 2020), or via UDM (Unified Data Management) (also referred to herein as a UDM node) towards an Access Management Function (AMF) 5G Core (also referred to herein as an AMF node), as described, e.g., in 3GPP TS 29.503, Rel. 16.2.0, (3 Mar. 2020).

As referenced herein, an exposure node refers to a SCEF and/or a NEF related to a type of access (e.g., 4G or 5G). Depending on the vendor, SCEF and NEF can be a combined node or in separate nodes. Additionally, an HSS and a UDM can be a combined node or in separate nodes. In other words, each of a SCEF and NEF, and each of a HSS and a UDM, can be co-located or deployed in separate functional entity nodes, respectively. See also, 3GPP TS 23.501, Rel. 16.3.0, clause 5.17.5, (3 Mar. 2020).

The following explanation of potential problems is a present realization as part of the present disclosure and is not to be construed as previously known by others. In some approaches, if an HSS and a UDM are not co-located, even if the SCEF and NEF are a combined EF, if a certain event reported by the serving node (e.g., MME/AMF/SMF) is required to be reported to the combined EF for both network domains (e.g., EPS/4G and 5GC), an event subscription is sent to both the HSS and the UDM to ensure that no matter where the UE/MTC device is camping (e.g., on 4G/EPS or 5GC), the event will be detected and reported. This may not be efficient from the network perspective since two parallel subscriptions need to be kept in the combined SCEF and NEF (also referred to herein as SCEF+NEF): one sent via diameter to an HSS; and one sent via HTTP towards a UDM.

Additionally, such an approach may result in a slow evolution and modernization of an operator's network because, for these deployments, the diameter protocol will still be used for these scenarios and operators may not be in favor of keeping such a legacy protocol and procedures. Instead, operators may want to evolve to cloud-native network functions (HTTP based) so that the procedures can be extended and enriched in the future.

Various embodiments of the present disclosure may provide solutions to these and other potential problems. In various embodiments of the present disclosure, an indication from an EF can be included in a subscription request to indicate that the event subscription is not only for the domain the target network function belongs to (e.g., 5GC in the case of a UDM), but also for a second domain (e.g., EPS domain). In order to receive potential notifications from the second domain (e.g., from an MME in EPS domain), a combined SCEF+NEF EF can additionally include its SCEF diameter identity. As a consequence, the second domain (e.g., EPS domain) can handle and report the event to the indicated diameter identity.

In some embodiments of the present disclosure, a service is offered by a HSS as a NF service producer. This service (e.g. common network exposure) can allow interwork with a UDM for network exposure, so that UDM (as a NF service consumer) can use the service (that is, subscribe to the HSS on behalf of EF) and offer a single subscription procedure to a combined SCEF+NEF.

In some embodiments of the present disclosure, an indication is included in a subscription response from a UDM to make a combined EF aware of an event being monitored in both domains (e.g., EPS and 5GC). As a consequence, the EF skips subscription towards an HSS.

FIG. 1 is a block diagram of a telecommunications network in accordance with various embodiments of the present disclosure.

Although the subject matter described herein may be implemented in any appropriate type of system using any suitable components, the embodiments disclosed herein are described in relation to a combined SCEF+NEF node for two network domains (4G/EPS and 5G), such as in the example telecommunications network illustrated in FIG. 1. For simplicity, the telecommunications network of FIG. 1 only depicts a combined SCEF+NEF node. In practice, the SCEF and NEF each may be separate nodes. Additionally, for simplicity, the telecommunications network of FIG. 1 only depicts HSS 107 and a unified data management node (UDM 113) as separate nodes. In practice, HSS 107 and UDM 113 may be in a combined node. Moreover, while various embodiments are described with reference to two network domains, 4G/EPS and 5G, respectively, the invention is not so limited, and includes any two or more network domains included in monitoring and notification of common event exposure. Additionally, while the telecommunications network of FIG. 1 also includes MME 103, unified data repository-EPS (UDR-EPS) node 105, access management function (AMF) node 109, UDR-5G node 111, and service capability server (SCS)/application server (AS)/application function (AF) 117, the identities of these nodes is used in a non-limiting manner and can refer to any type of network node that performs the operations described for each in more detail below.

FIG. 1 illustrates an example of a telecommunications network represented as a 4G/EPS and a 5G network architecture composed of core network functions, where interaction between network functions is represented by a point-to-point reference point/interface.

Seen from the access side, the network architecture in FIG. 1 includes a user equipment (UE) 101 connected to two radio access networks (RAN) (5G RAN 119 and 4G/EPC RAN 121) by a wireless interface. Typically, a RAN comprises base stations, such as evolved Node Bs (eNBs) or 5G base stations (gNBs) or similar nodes. Seen from the 5G core network side, the 5G core network functions shown in FIG. 1 include an AMF 109, a UDR-5G 111, a UDM 113, and a SCEF+NEF combined node 115. Seen from the 4G/EPC core network side, the 4G/EPC network functions shown in FIG. 1 an MME 103, UDR-EPS 105 and HSS-FE 107. SCS/AS/AF 117 also is shown in FIG. 1 and is communicatively connected to the 5G core network and the 4G core network.

FIGS. 2a-2d is an exemplary signalling sequence for common event exposure in accordance with some embodiments of the present disclosure. The embodiments of FIGS. 2a-2d are presented as teaching examples and are not to be construed as limiting the scope of the disclosed subject matter. For example, certain details of the described embodiments may be modified, omitted, or expanded upon without departing from the scope of the described subject matter.

The signalling flows of FIGS. 2a-2d will now be generally described.

At operations 201-203, SCS/AS/AF 117 subscribes to an event (e.g., location change) to be monitored and reported.

At operations 205-209, SCEF+NEF combined node 115 initiates a subscription towards UDM 113 that includes two information elements in accordance with various embodiments of inventive concepts:

A first information element includes an indication of common-network-exposure. That is, that the EF is a combined SCEF+NEF (e.g., SCEF+NEF combined node 115), so that if possible, a second network domain (e.g., EPS domain) should also report the event if detected without the need for a separate subscription towards a HSS (e.g., HSS-FE 107).

A second information element includes an identification of combined SCEF+NEF (e.g., SCEF+NEF combined node 115) for reporting on the event in the second network domain (e.g., the combined SCEF diameter identity (SCEF Id), since it may be needed by the MME (e.g., MME 103) when reporting the event given that the SCEF Id is the destination address for the reporting in the second network domain (e.g., EPS domain via T6a diameter interface)

It is noted that the SCEF id is a diameter uniform resource identifier (URI) and the NEF address is a HTTP URI. Optionally, both URIs can be the same when it comes to identifying the domain part (e.g. combined-scef-nef-1.ericsson.com).

At operations 211-215, in addition to configuring the event in AMF 109 to be detected in 5GC, UDM 113 checks (via local configuration or via NRF discovery) that there are HSS instances which offer the common exposure service.

At operations 215-225, if there are HSS instances that offer the common exposure service, UDM 113 subscribes to HSS via a common-exposure-service. The subscription includes the type of event, the UDM notification address in case the event is terminated in HSS, and the SCEF-id.

At operations 227-231a, 231b, if the procedure towards a HSS is successful, UDM 113 returns an indication in the response to EF to inform that EPS domain is also monitoring (and reporting) the event. Hence, no parallel subscription is done towards HSS.

At operations 233-239, event changes (e.g., location changes) are reported to the correct addresses in the combined node (e.g., MME 103 reports to SCEF in SCEF+NEF combined node 115 and AMF 109 reports to NEF in SCEF+NEF combined node 115).

At operations 241-251, if UDM 113 failed when configuring the event in EPS domain (e.g., no common exposure supported and/or no combined HSS/UDM exists), UDM 113 does not include an indication of common-exposure in the response to EF. As a consequence, EF performs a parallel subscription to HSS so that the event is monitored in 4G.

The operations of FIGS. 2a-2d are now described in more detail.

Figure 2A:
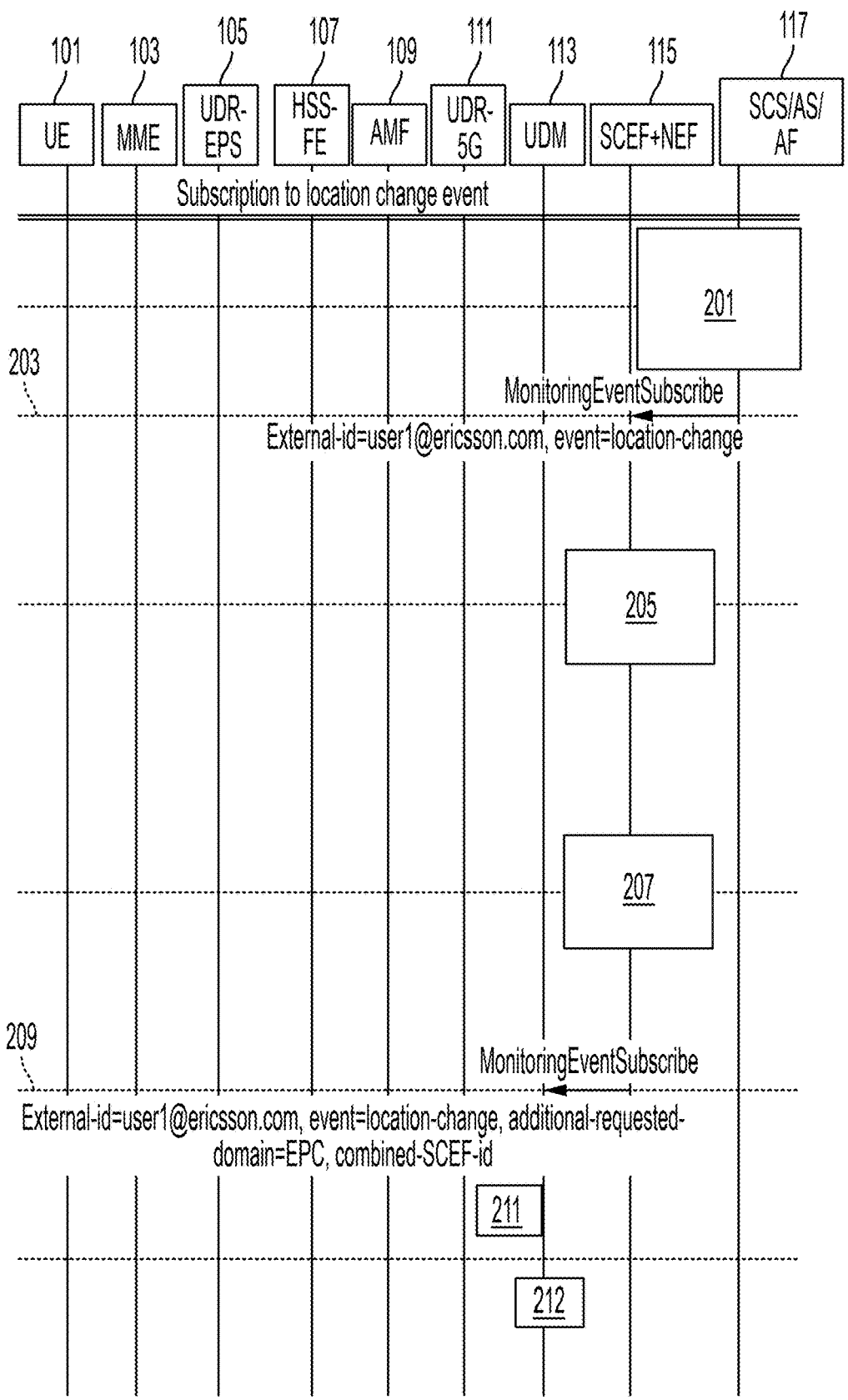
FIGS. 2a-2d illustrate an exemplary signalling sequence for common event exposure in accordance with various embodiments of the present disclosure.

Referring to FIG. 2a, at 201, an application of network node 117 (e.g., a service capability server (SCS), an application server (AS), and/or an application function node (AF), collectively referred to herein as SCS/AS/AF 117) initiates a subscription to an event for a given UE (e.g., UE 101) so that the event is reported when the event occurs (e.g., a location change). At 203, SCS/AS/AF 117 initiates a request (e.g., MonitoringEventSubscribe) towards SCEF+NEF combined node 115 for the subscription for monitoring and receiving notification when the event occurs. The request includes an identification of the UE (e.g., External-id=user1@ericsson.com) and an identifier of the event (e.g., event=location-change).

While SCEF+NEF combined node 115 combines SCEF and NEF, combined node 115 is configured (via a local policy) to use a single endpoint (e.g., a UDM) as a target for the subscription. Hence, at 205, SCEF+NEF combined node 115 includes an indication that location changes in Evolved Packet Core (EPC)/4G are also requested for notification to combined SCEF/NEF node 115 via the event subscription. That is, without subscribing to the same event to HSS (e.g., HSS front end (HSS-FE) 107) via an s6t diameter interface.

At operation 207, the SCEF+NEF combined node 115 diameter identity is also included for an EPC/MME (e.g., MME 103) to report directly via T6a if there are location changes detected in EPC. As a consequence, an AMF (e.g., AMF 109) reporting location changes to the SCEF+NEF combined node 115 (using 5GC HTTP-based notification)

and MME 103 reporting location changes to SCEF+NEF combined node 115 (e.g., using legacy diameter protocol).

At 209, SCEF+NEF combined node 115 initiates a request (e.g., MonitoringEventSubscribe) towards UDM 113. The request includes the identification of the UE (e.g., External-id=user1@ericsson.com), the identifier of the event (e.g., event=location-change), an identifier of an additional requested domain (e.g., additional-requested-domain=EPC), and an identifier for the SCEF+NEF combined node 115 for the additional requested domain (e.g., combined-SCEF-id).

At 211, UDM 113 stores the subscription data sent by SCEF+NEF combined node 115 (e.g., event type=location change, NEF notification address, and combined-SCEF-id). In some embodiments, the UDM 113 stored the configuration in 5GS-UDR. At 212, the UDM 113 configures the monitoring event for the UE in 5GC. In some embodiments, the UDM 113 contacts that corresponding NF within the 5GC (e.g., AMF, SMF) as needed by the monitoring event.

At 214, the UDM 113 replies to the combined SCEF+NEF including confirmation that the configuration of the monitoring event was successful in both 5GC and EPC domains. Some embodiments provide that a UDM 113 that supports interworking with EPC may rely on the HSS to synchronize the status of these monitoring events in the EPC domain with the UDM 113. For example, the UDM 113 may not need to configure the monitoring event in HSS.

In some embodiments, The SCEF+NEF need not perform the same procedures for the configuration of monitoring events towards the HSS+UDM twice. For example, if the HSS+UDM is deployed as a combined node, a monitoring event only need to be configured by the SCEF+NEF just once.

Some embodiments provide that the SCEF+NEF can configure monitoring events applicable to both EPC and 5GC using only 5GC procedures towards UDM. In this case, the SCEF+NEF may indicate that the monitoring event is also applicable to EPC (i.e. the event must be reported both by 5GC and EPC) and may include a SCEF identity (i.e. if the event needs to be configured in a serving node in the EPC and the corresponding notification needs to be sent directly to the SCEF). If the HSS and UDM are deployed as separate network entities, UDM shall use HSS services to configure the monitoring event in EPC as defined in 3GPP TS 23.632 [102]. The UDM shall return an indication to SCEF+NEF of whether the configuration of the monitoring event in EPC was successful. In the case that the UDM reports that the configuration of a monitoring event was not possible in EPC, then the SCEF+NEF may configure the monitoring event using EPC procedures via the HSS as defined in 3GPP TS 23.682 [36]. In some embodiments, the SCEF+NEF uses only 5GC procedures to configure monitoring events in EPC and 5GC.

Figure 2B:
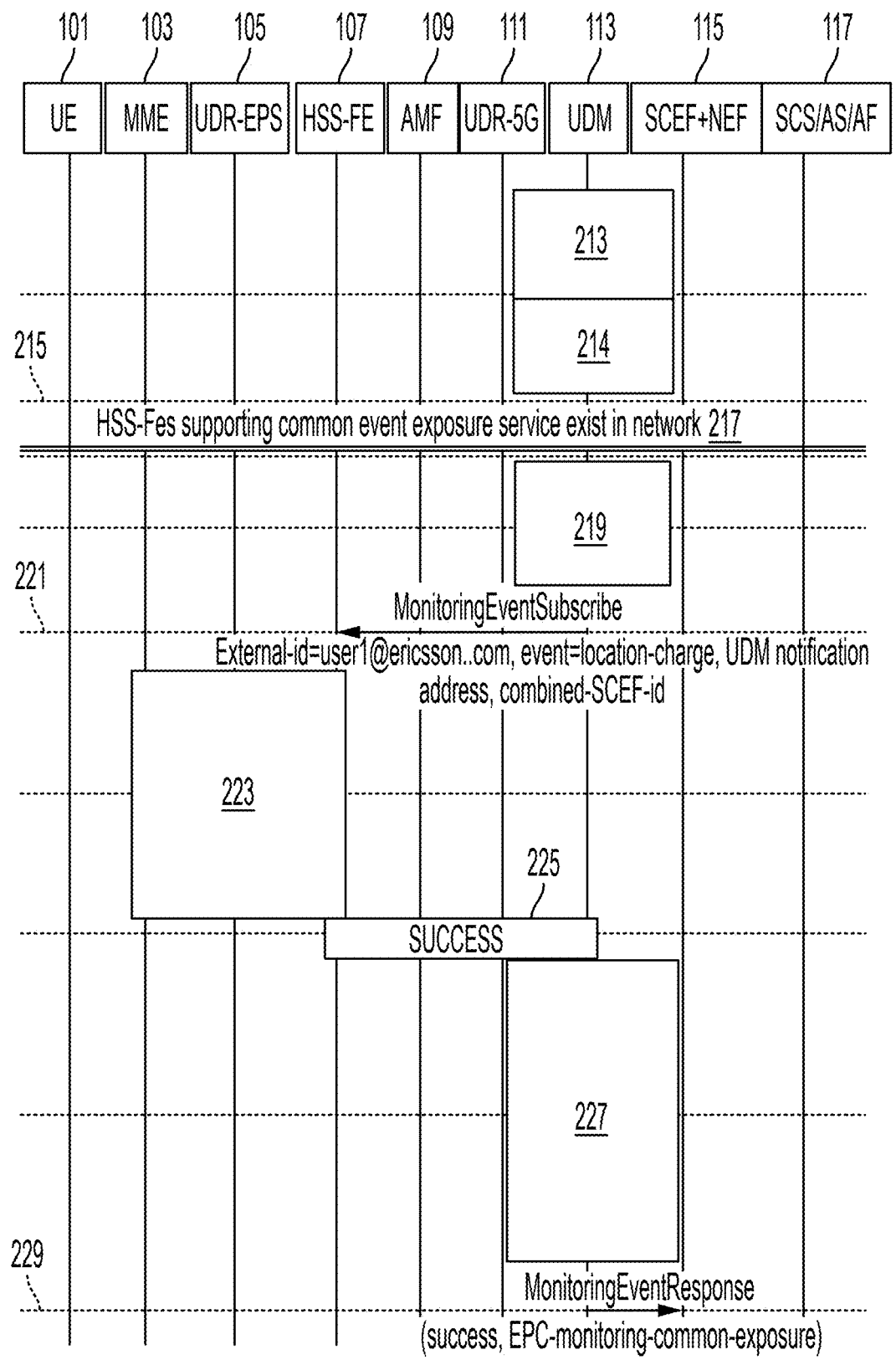

Referring to FIG. 2b, at 213 and 215, UDM 113 checks (via a network repository function (NRF)) whether there is a HSS-FE in the network offering the common event exposure service (e.g., nhss-common-ee).

Figure 2C:
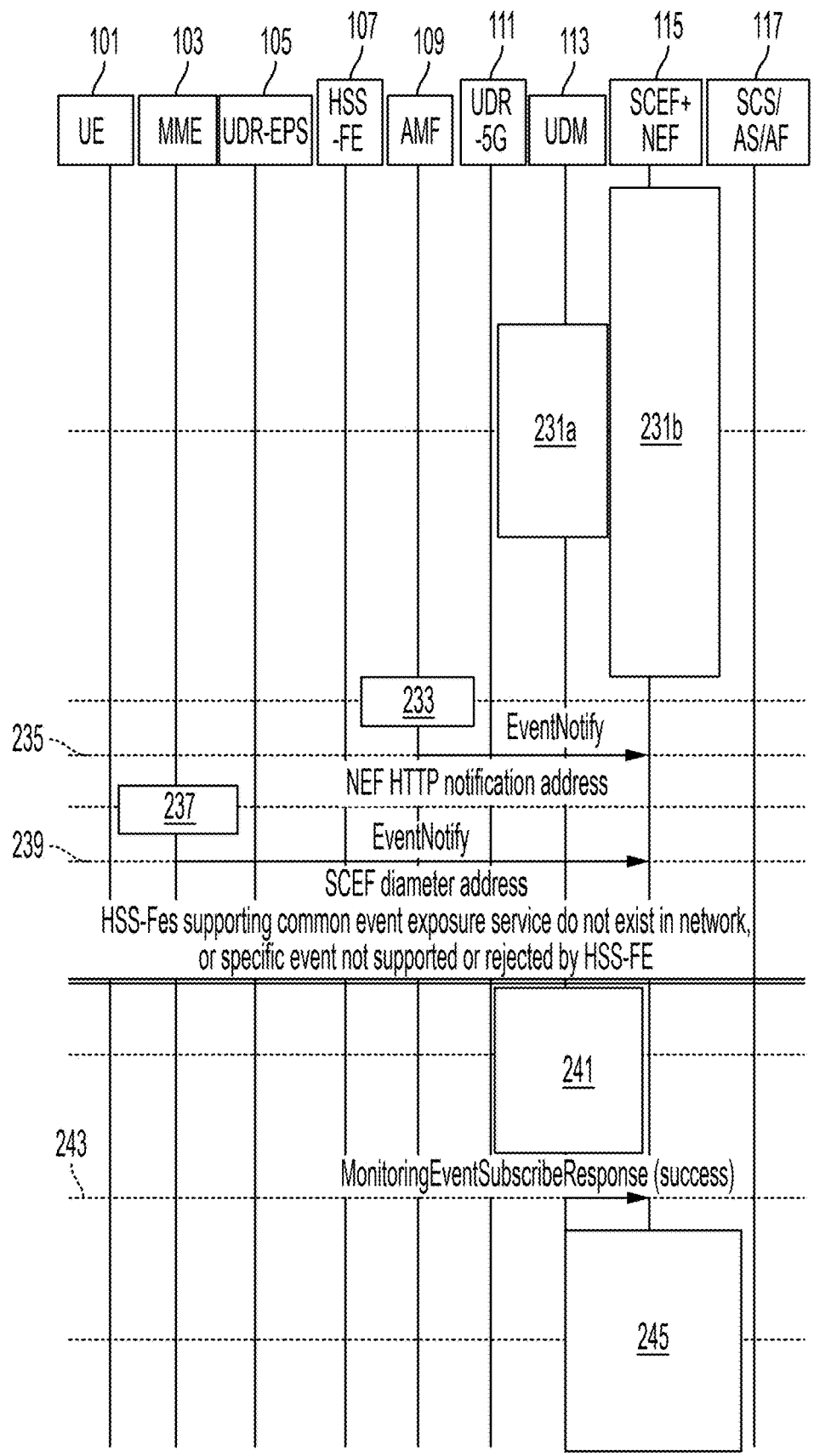

Responsive to operations 213 and 215 and referring to FIGS. 2b-2c, operations 217-239 can occur when a HSS-FE supporting common event exposure service exists in the network. Alternatively, when a HSS-FE supporting common event exposure service is not identified, or the specific event is not supported or is rejected by a HSS-FE, operations 241-251 of FIGS. 2c-2d can occur.

Referring first to FIGS. 2b-2c and operations 217-239, at operation 217, a HSS-FE supporting common event exposure service in the network is identified (e.g., HSS-FE 107).

At 219, UDM 113 initiates a subscription to HSS-FE 107 via a new service (e.g., nhss-ee) produced by HSS-FE 107. At 221, UDM 113 initiates a request (e.g., MonitoringEvent-Subscribe) towards HSS-FE 107. The request includes the identification of the UE (e.g., External-id=user1@ericsson.com), the identifier of the event (e.g., event=location-change), an identifier of the UDM (e.g., UDM notification address), and the identifier for the SCEF+NEF combined node 115 (e.g., combined-SCEF-id).

At 223, HSS-FE 107 stores the subscription information in another network node (e.g., unified data repository (UDR)-evolved packet system (EPS) UDR-EPS node 105). The subscription information includes, e.g., the event type, the identification of the UE, the identifier of the UDM, and the identifier for the SCEF+NEF combined node 115. HSS-FE 107 configures the event in a mobility management entity node (e.g., MME 103) so that it will be reported to SCEF+NEF combined node 115.

At 225, HSS-FE 107 initiates a response to UDM 113 indicating the HSS-FE 107 successfully accepted the subscription from UDM 113, including an indication that the event (e.g., location change) is being monitored in the EPC domain. As a consequence, MME 103 will also report the event detected in EPC via the same subscription indicated by SCEF+NEF combined node 115 (e.g., common exposure).

At 229, UDM 113 initiates a response (e.g., MonitoiringEventSubscribeResponse) towards SCEF+NEF combined node 115 indicating that a single subscription was applied to the at least two network domains (e.g., EPC and 5G). The response also includes an indication notifying SCEF+NEF combined node 115 that the event is being monitored in each of the at least two network domains (e.g., EPC-monitoring-common-exposure).

Referring to FIG. 2c, at 231a, UDM 113 initiates administrative notifications (e.g., event manually ended) will be reported by UDM 113 to SCEF+NEF combined node 115 without involving HSS-FE 107. At 231b, because the subscription for common exposure has been accepted, SCEF+NEF combined node 115 does not initiate the subscription to HSS-FE 107 via diameter (e.g., s6t interface. Notifications related to the event (e.g., location change) for both of the at least two network domains (e.g., EPC and 5G) will be sent by MME 103 and AMF node 109 to SCEF+NEF combined node 115.

At 233, AMF 109 detects the event (e.g., a location change).

At 235, AMF 109 initiates a notification (e.g., EventNotify) towards SCEF+NEF combined node 115. The notification includes a notification address for SCEF+NEF combined node 115 (e.g., SCEF+NEF HTTP notification address.

At 237, MME 103 also detects the event (e.g., the location change) in the second network domain.

At 237, MME 103 initiates a notification (e.g., EventNotify) towards SCEF+NEF combined node 115. The notification includes a notification address for SCEF+NEF combined node 115 (e.g., SCEF+NEF diameter address).

Figure 2D:
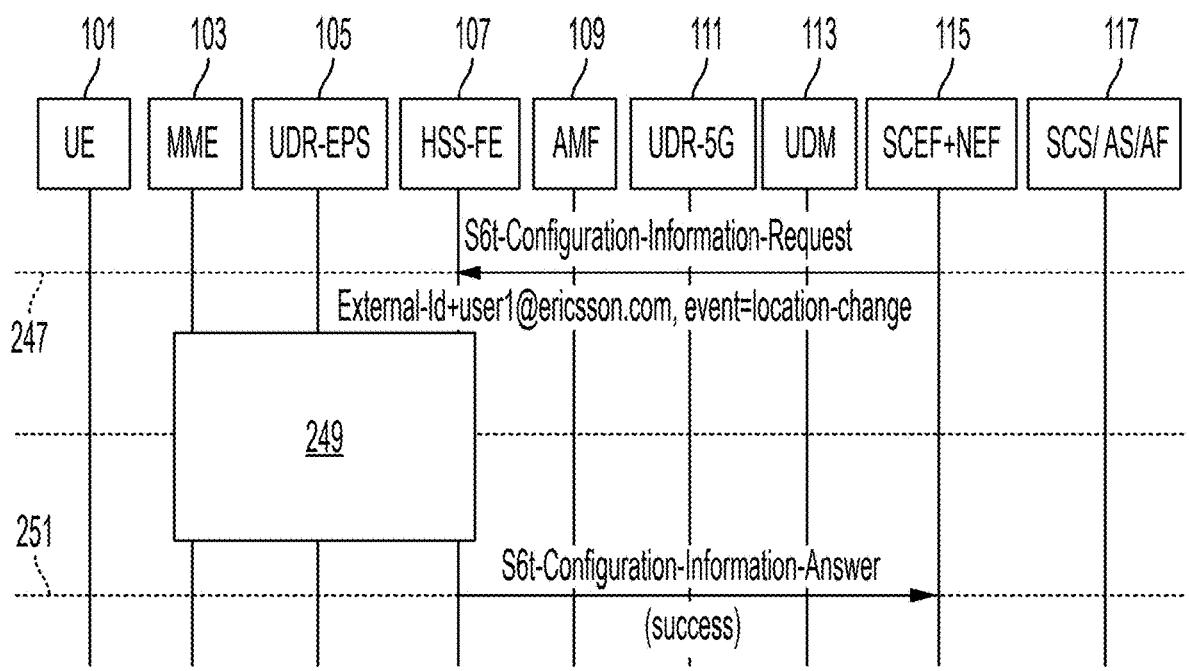

Referring to FIGS. 2c-2d and as referenced above, alternatively, when a HSS-FE supporting common event exposure service is not identified, or the specific event is not supported or is rejected by a HSS-FE, operations 241-251 of FIGS. 2c-2d can occur.

At 241, responsive to operations 213 and 215, UDM 113 initiates a response to SCEF+NEF combined node 115 without an explicit indication that the event (e.g., location change) is being monitored in a second network domain (e.g., EPC). As a consequence, only AMF 109 will notify SCEF+NEF combined node 115 about a detected evet (e.g., a location change) (in other words, no common network exposure).

At 243, UDM 113 initiates a response (e.g., MonitoringEventSubscribeResponse) towards SCEF+NEF combined node 115. The response includes an indication notifying SCEF+NEF combined node 115 that the event is being monitored in one of the at least two network domains (e.g., in 5G).

At 245, since there is no indication that the event has been configured in a second network domain (e.g., EPC) with a single subscription towards UDM 113, SCEF+NEF combined node 115 initiates a subscription towards HSS-FE 107 for MME 103 to monitor and report the event in a second network domain (e.g., EPC).

At 247, SCFE+NEF combined node 115 initiates a request (e.g., s6t-Configuration-Information-Request) towards HSS-FE 107 for s subscription to monitor and report on the event in the second network domain (e.g., EPC). The request includes the identification of the UE and the identifier of the event (e.g., event=location-change).

At 249, HSS-FE 107 stores the subscription information (e.g., event type, the identification of the UE, and the identification of the SCEF+NEF combined node 115) in UDR-EPS 105, and configures the event in MME 103 for reporting detected events to SCEF+NEF combined node 115.

At 251, HSS-FE 107 initiates a response (e.g., s6t-Configuration-Information-Answer) towards SCEF+NEF combined node 115. The response includes an indication that the event has been successfully configured for MME 103 to monitor and report the event in the second network domain (e.g., EPC).

In various embodiments of the present disclosure, a method is provided for common network exposure in deployments/networks where HSS and UDM are not combined (e.g., which may be the case for some vendors). Thus, the method may provide an advantage by avoiding the need for duplicated subscriptions from the combined EF.

Additionally, the method may provide a further advantage by allowing evolution of the network in a more cloud-native fashion since the method offers a single point of entry (e.g., HTTP-based) for network exposure. As a consequence, the method may be future proof since it can be enriched without the need to support legacy diameter protocols endlessly.

Figure 5:
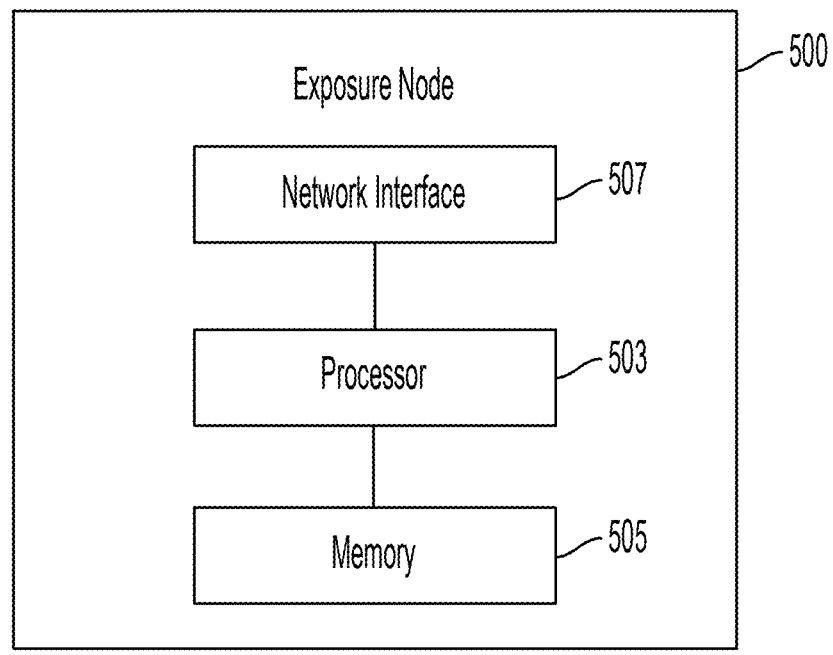
FIG. 5 is a block diagram of elements of an exposure node that are configured according to some embodiments of the present disclosure.
Figure 7:
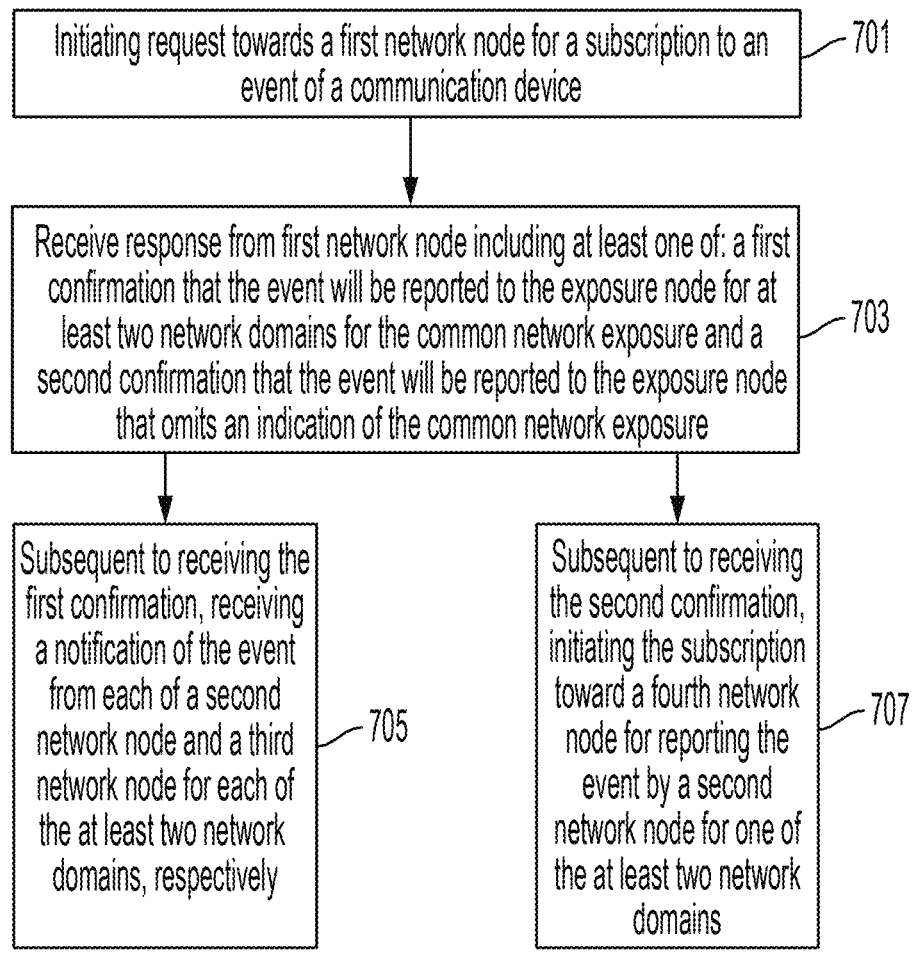
FIG. 7 is a flowchart of operations that may be performed by an exposure node, in accordance with some embodiments of the present disclosure.

Operations of an exposure node (e.g., SCEF+NEF combined node 115 implemented using the structure of the block diagram of FIG. 5) will now be addressed with reference to the flow chart of FIG. 7 according to various embodiments of inventive concepts. For example, modules may be stored in memory 505 of FIG. 5, and these modules may provide instructions so that when the instructions of a module are executed by at least one processor 503, the at least one processor 503 performs respective operations of the flow chart.

Figure 9:
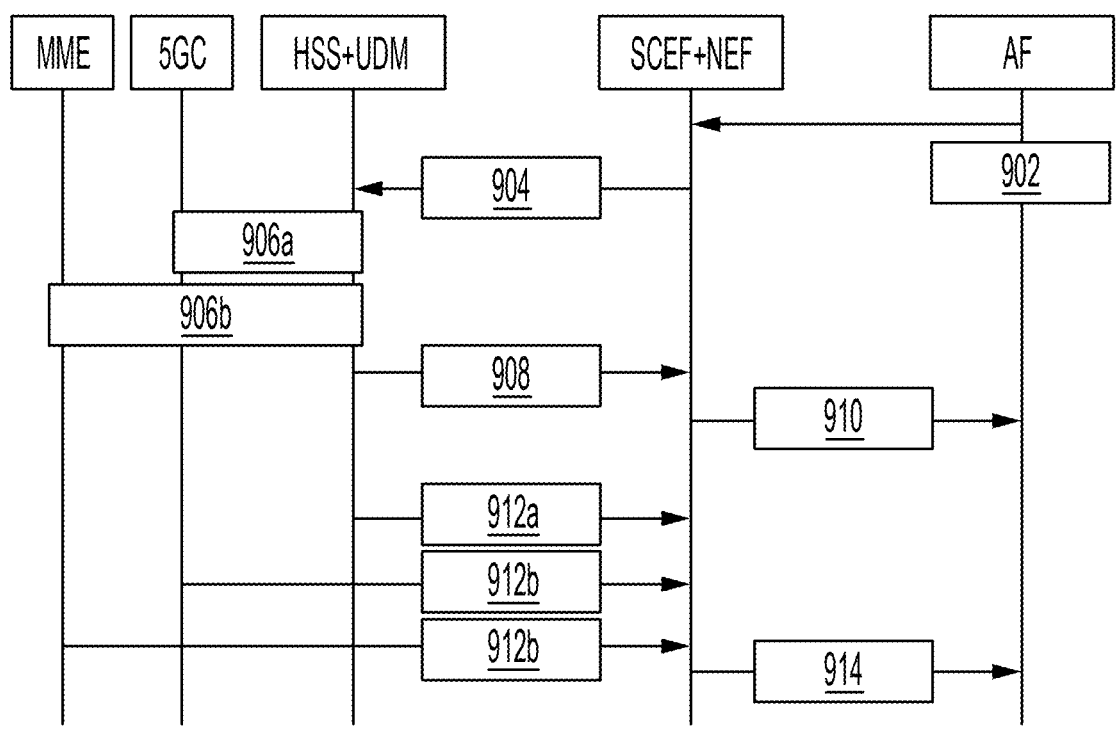
FIG. 9 illustrates an exemplary signalling sequence for common event exposure in accordance with various embodiments of the present disclosure.

Reference is now made to FIG. 9 illustrates an exemplary signalling sequence for common event exposure in accordance with various embodiments of the present disclosure. As illustrated, the information flow to configure monitoring events applicable to both EPC and 5GC using 5GC procedures towards UDM in scenarios where interworking between 5GS and EPC is possible is provided. At 902, the AF configures a monitoring event via the SCEF+NEF using the Nnef_EventExposure_Subscribe service operation. At 904, SCEF+NEF configures the monitoring event in the UDM+HSS using the Nudm_EventExposure_Subscribe service operation. In some embodiments, the combined SCEF+NEF indicates that the monitoring event is also applicable to EPC (i.e. the event must be reported both by 5GC and EPC). Depending on the type of event, the SCEF+NEF may include a SCEF identity (i.e. if the event needs to be configured in a serving node in the EPC and the corresponding notification needs to be sent directly to the SCEF).

At 906a and 906b, the HSS+UDM configures the monitoring event. For events that need to be reported a serving node (e.g. location change) the HSS+UDM requests the configuration of the monitoring event to the corresponding serving node in the 5GC and EPC. The HSS+UDM uses the corresponding Nnf_EventExposure_Subscribe service operation to configure monitoring events in 5GC serving NFs. The HSS+UDM uses the procedures defined in 3GPP TS 23.682 [23] to configure monitoring events in EPC serving nodes (i.e. at the MME). The HSS+UDM provides the MME with the SCEF ID during the configuration of the monitoring event in EPC. If the HSS and UDM are deployed as separate network entities, UDM shall use HSS services to configure the monitoring event in EPC as defined in 3GPP TS 23.632 [68].

At 908, the HSS+UDM replies to the SCEF+NEF with the indication that the monitoring event was successfully configured in 5GC and EPC by sending the Nudm_EventExposure_Subscribe Response.

At 910, the SCEF+NEF responds to AF by sending Nnef_EventExposure_Subscribe Response.

At 912a, 912b and 912c, the SCEF+NEF is notified when HSS+UDM or the serving node at the 5GC or EPC detects the corresponding event. The HSS+UDM notifies the SCEF+NEF using the Nudm_EventExposure_Notify service operation. A serving NF in the 5GC notifies the SCEF+NEF using the corresponding Nnf_EventExposure_Notify service operation. The MME notifies the SCEF+NEF using the procedures defined in 3GPP TS 23.682 [23] using the SCEF identity provided by the HSS+UDM in operation 906.

At 914, the SCEF+NEF notifies the AF using the Nnef_EventExposure_Notify service operation.

Referring to FIG. 7, at 701, exposure node (e.g., 115, 500) initiates a request towards a first network node for a subscription to an event of a communication device. The request includes subscription information including an indication of a common network exposure in at least two network domains, including the first network domain that the first network node belongs to and at least one additional network domain, for a reporting on the event and a second identity of the exposure node for the reporting on the event for the at least one additional second network domain.

At 703, the exposure node, responsive to the request, receives a response from the first network node. The response includes at least one of: a first confirmation that the event will be reported to the exposure node for the second network domain for the common network exposure and a second confirmation that the event will be reported to the exposure node for the first network domain. The second confirmation omits an indication of the common network exposure.

In some embodiments, operations of the exposure node can further include, subsequent to receiving the first confirmation, receiving (705) a notification of the event from each of a second network node and a third network node for each of the at least two network domains, respectively.

In some embodiments, the subscription includes a single subscription to the event in the at least two network domains.

In some embodiments, the identity of the exposure node includes a combined service capabilities exposure function (SCEF) diameter identity for the second network domain.

In some embodiments, the receiving a notification of the event from each of a second network node and a third network node for each of the at least two network domains, respectively includes: receiving the notification of the event from the second network node via a diameter protocol; and receiving the notification of the event from the third network node via an http-based notification.

In some embodiments, operations of the exposure node can further include, subsequent to receiving only the second confirmation, initiating (707) the subscription towards a fourth network node for reporting the event by a second network node for the second network domain.

In some embodiments, the first network node is a unified data management (UDM) node in a 5GC network.

In some embodiments, the second network node is a mobility management entity node (MME) in an evolved packet core (EPC) network.

In some embodiments, the third network node is at least one of an access management function node (AMF) and a session management function node (SMF) in a 5GC network.

In some embodiments, the fourth network node is a home subscriber server (HSS) in an evolved packet core (EPC) network.

In some embodiments, the first identity of the exposure node in the first network domain is an identity of a network exposure function node (NEF).

Various operations from the flow chart of FIG. 7 may be optional with respect to some embodiments of exposure nodes and related methods. For example, operations of blocks 705-707 may be optional.

Corresponding embodiments of inventive concepts for an exposure node, computer products, and computer programs are also provided.

Figure 6:
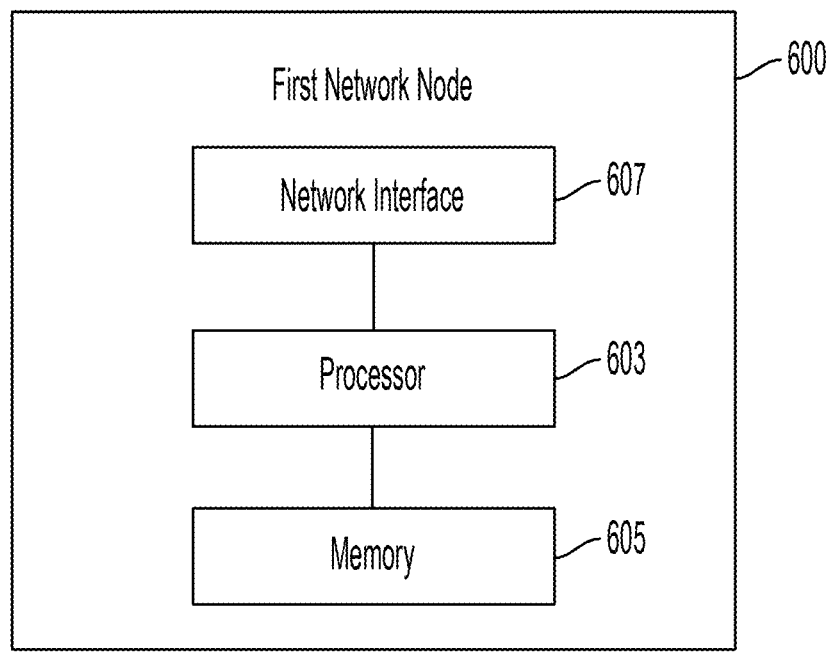
FIG. 6 is a block diagram of elements of a first network node that are configured according to some embodiments of the present disclosure.
Figure 8:
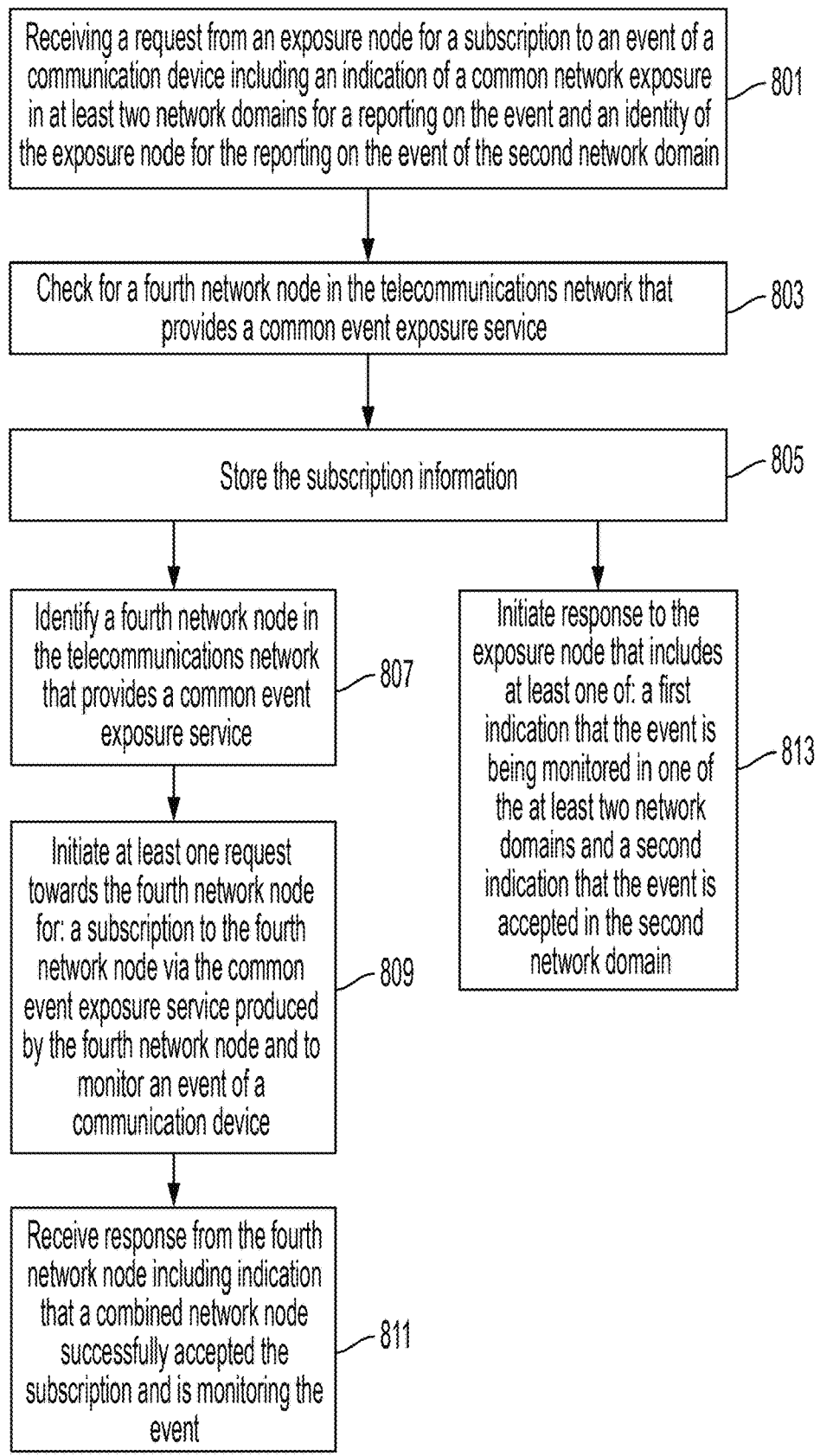
FIG. 8 is a flowchart of operations that may be performed by a first network node, in accordance with some embodiments of the present disclosure.

Operations of a first network node (e.g., UDM 113 implemented using the structure of the block diagram of FIG. 6) will now be addressed with reference to the flow chart of FIG. 8 according to some embodiments of inventive concepts. For example, modules may be stored in memory 605 of FIG. 6, and these modules may provide instructions so that when the instructions of a module are executed by at least one processor 603, the at least one processor 603 performs respective operations of the flow chart.

Referring to FIG. 8, first network node (e.g., UDM 113, 500) receives (801) a request from an exposure node for a subscription to an event of a communication device. The request includes an indication of a common network exposure in at least a second network domain for a reporting on the event and an identity of the exposure node for the reporting on the event for the second network domain. The first network node further checks (803) for a fourth network node in the telecommunications network that provides a common event exposure service.

In some embodiments, operations of the first network node can further include storing (805) the subscription information.

In some embodiments, operations of the first network node can further include identifying (807) a fourth network node in the telecommunications network that provides a common event exposure service. The operations further include initiating (809) at least one request towards a fourth network node for: a subscription to the fourth network node via the common event exposure service produced by the fourth network node and to monitor an event of a communication device. The operations further include, responsive to the at least one request, receiving (811) a response from the fourth network node including an indication that a combined network node successfully accepted the subscription and is monitoring the event.

In some embodiments, operations of the first network node can further include, responsive to the request, initiating (813) a response to the exposure node. The response includes at least one of: a first indication that the event is being monitored in one of the at least two network domains and a second indication that the event is accepted in the second network domain.

In some embodiments, the first network node includes a unified data management (UDM) node in a 5GC network.

In some embodiments, the second network node comprises a home subscriber server (HSS) in an evolved packet core (EPC) network.

Various operations from the flow chart of FIG. 8 may be optional with respect to some embodiments of a first network node and related methods. For example, operations of blocks 805-813 may be optional.

Figure 3:
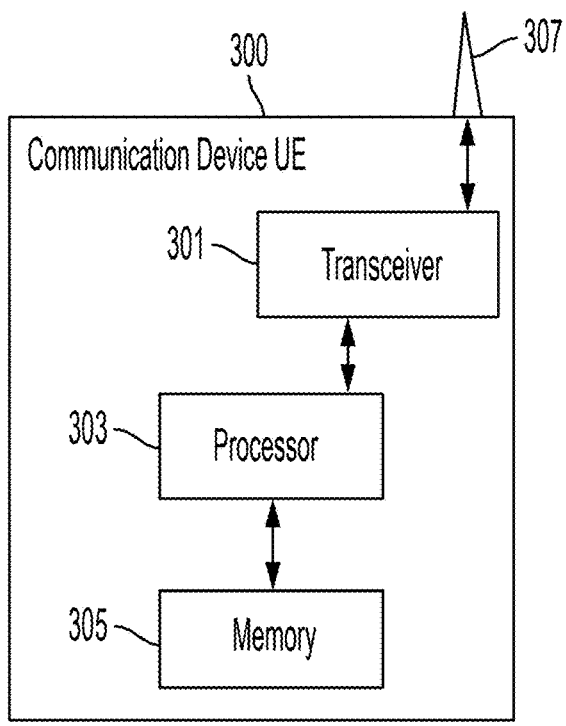
FIG. 3 is a block diagram of elements of a communication device that are configured according to some embodiments of the present disclosure.

Corresponding embodiments of inventive concepts for a first network node, computer products, and computer programs are also provided Example Communication Device and Network Nodes FIG. 3 is a block diagram illustrating a communication device 300 (e.g., UE 101 in FIG. 1) that is configured according to some embodiments. Within the context of this disclosure, the term communication device encompasses a device which is able to communicate with a network node, such as a base station, or with another wireless device by transmitting and/or receiving wireless signals. Thus, the term communication device encompasses, but is not limited to: a mobile phone, a stationary or mobile wireless MTC device for machine-to-machine communication, an integrated or embedded wireless card, an externally plugged in wireless card, etc. The communication device 300 includes a transceiver 301 comprising one or more power amplifiers the transmit and receive through antennas of an antenna array to provide uplink and downlink radio communications with a radio network node (e.g., a base station, eNB, gNB, etc.) of a telecommunications network. Instead of or in addition to the transceiver 301, the communication device 300 may include a light reception front-end configured to receive light signaling such from a Light WiFi AP. Communication device 300 further includes a processor circuit 303 (also referred to as a processor) coupled to the transceiver 301 and a memory circuit 305 (also referred to as memory). The memory 305 stores computer readable program code that when executed by the processor circuit 303 causes the processor circuit 303 to perform operations according to embodiments disclosed herein. According to other embodiments, processing circuitry 303 may be defined to include memory so that a separate memory circuitry is not required.

Figure 4:
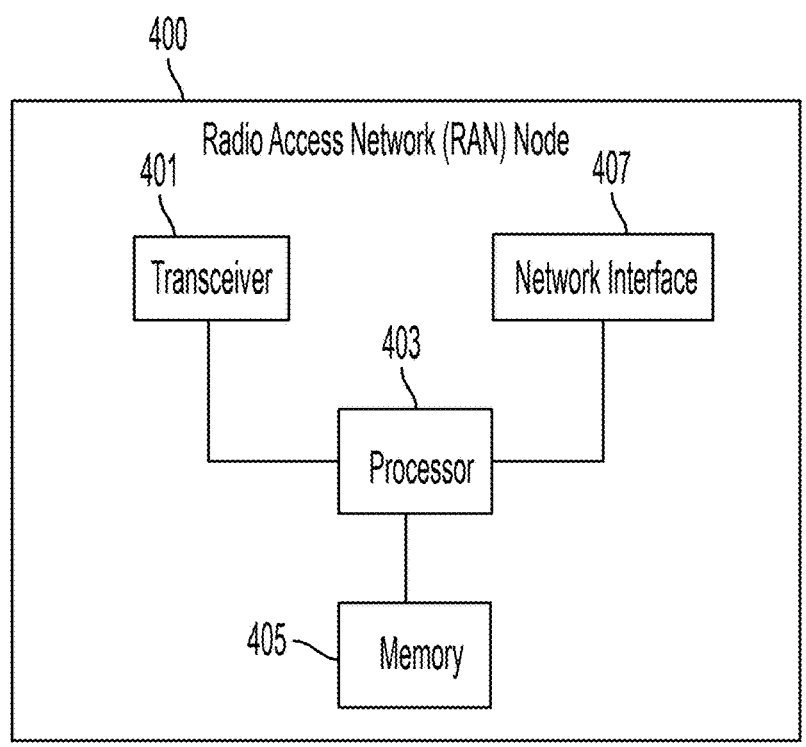
FIG. 4 is a block diagram of elements of a radio access node that are configured according to some embodiments of the present disclosure.

FIG. 4 is a block diagram illustrating a radio access network node 400 (e.g., a base station, eNB, gNB, 5G RAN node 199 in FIG. 1, EPC RAN node 121 in FIG. 1, etc.) of a telecommunications network. The network node 400 includes a processor circuit 403 (also referred to as a processor), a memory circuit 405 (also referred to as memory), and a network interface 407 (e.g., wired network interface and/or wireless network interface) configured to communicate with other network nodes. The network node 400 may be configured as a radio network node containing a transceiver 401 and/or a light signaling front-end with one or more power amplifiers that transmit and receive through antennas of an antenna array. The memory 405 stores computer readable program code that when executed by the processor 403 causes the processor 403 to perform operations according to embodiments disclosed herein. According to other embodiments, processing circuitry 403 may be defined to include memory so that a separate memory circuitry is not required.

FIG. 5 is a block diagram illustrating an exposure node 500 (e.g., SCEF+NEF combined node 115 in FIG. 1) of a telecommunications network. The exposure node 500 includes network interface circuitry 507 (also referred to as a network interface) configured to provide communications with other nodes of a core network and/or the radio access network RAN. The exposure node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the exposure node 500 may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed herein with respect to example embodiments relating to exposure network nodes).

FIG. 6 is a block diagram illustrating a first network node 600 (e.g., UDM 113 in FIG. 1) of a telecommunications network. The first network node 600 includes network interface circuitry 607 (also referred to as a network interface) configured to provide communications with other nodes of a core network and/or the radio access network RAN. The first network node may also include a processing circuitry 603 (also referred to as a processor) coupled to the network interface circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the first network node 600 may be performed by processing circuitry 603 and/or network interface circuitry 607. For example, processing circuitry 603 may control network interface circuitry 607 to transmit communications through network interface circuitry 607 to one or more other network nodes and/or to receive communications through network interface circuitry from one or more other network nodes. Moreover, modules may be stored in memory 605, and these modules may provide instructions so that when instructions of a module are executed by processing circuitry 603, processing circuitry 603 performs respective operations (e.g., operations discussed herein with respect to example embodiments relating to exposure network nodes).

FURTHER DEFINITIONS AND EMBODIMENTS ARE DISCUSSED BELOW

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Claims are provided below. Reference numbers/letters are provided in parenthesis by way of example/illustration without limiting claims to particular elements indicated by reference numbers/letters.

The invention claimed is:

1. A method performed by an exposure node having a first identity in a first network domain in a telecommunications network, the method comprising:
   initiating a request towards a first network node for a subscription to an event of a communication device, wherein the request comprises subscription information including an indication of a common network exposure in at least two network domains, including the first network domain that the first network node belongs to and at least one second network domain, for a reporting on the event, and the subscription information further including a second identity of the exposure node for the reporting on the event for the at least one second network domain;
   responsive to the request, receiving a response from the first network node, wherein the response comprises at least one of: a first confirmation that the event will be reported to the exposure node for the second network domain for the common network exposure and a second confirmation that the event will be reported to the exposure node for the first network domain, wherein the second confirmation omits an indication of the common network exposure; and
   subsequent to receiving the first confirmation, receiving a notification of the event from each of a second network node and a third network node for each of the at least two network domains, respectively.

2. The method of claim 1, wherein the subscription comprises a single subscription to the event in the at least two network domains.

3. The method of claim 1, wherein the second identity of the exposure node comprises a combined service capabilities exposure function (SCEF) diameter identity for the second network domain.

4. The method of claim 1, wherein receiving the notification of the event from each of the second network node and the third network node for each of the at least two network domains, respectively comprises:
   receiving the notification of the event from the second network node via a diameter protocol; and
   receiving the notification of the event from the third network node via an http-based notification.

5. The method of claim 1, further comprising:
   subsequent to receiving only the second confirmation, initiating the subscription towards a fourth network node for reporting the event by the second network node for the second network domain.

6. The method of claim 5, wherein the fourth network node comprises a home subscriber server (HSS) in an evolved packet core (EPC) network.

7. The method of claim 1, wherein the first network node comprises a unified data management (UDM) node in a 5GC network.

8. The method of claim 1, wherein the second network node comprises a mobility management entity node (MME) in an evolved packet core (EPC) network.

9. The method of claim 1, wherein the third network node comprises at least one of an access management function node (AMF) and a session management function node (SMF) in a 5GC network.

10. The method of claim 1, wherein the first identity of the exposure node in the first network domain is an identity of a network exposure function node (NEF).

11. An exposure node having a first identity in a first network domain in a telecommunications network, the exposure node comprising:
- at least one processor; and
- at least one memory coupled with the at least one processor, wherein the at least one memory includes instructions that when executed by the at least one processor causes the exposure node to perform operations comprising:
- initiating a request towards a first network node for a subscription to an event of a communication device, wherein the request comprises subscription information including an indication of a common network exposure in at least two network domains, including the first network domain that the first network node belongs to and at least one second network domain, for a reporting on the event, and the subscription information further including a second identity of the exposure node for the reporting on the event for the at least one second network domain;
- responsive to the request, receiving a response from the first network node, wherein the response comprises at least one of: a first confirmation that the event will be reported to the exposure node for the second network domain for the common network exposure and a second confirmation that the event will be reported to the exposure node for the first network domain, wherein the second confirmation omits an indication of the common network exposure; and
- subsequent to receiving the first confirmation, receiving a notification of the event from each of a second network node and a third network node for each of the at least two network domains, respectively.

12. A computer program product comprising a non-transitory storage medium storing program code to be executed by at least one processor of an exposure node, whereby execution of the program code causes the exposure node to perform operations comprising:
- initiating a request towards a first network node for a subscription to an event of a communication device, wherein the request comprises subscription information including an indication of a common network exposure in at least two network domains, including first network domain that the first network node belongs to and at least one second network domain, for a reporting on the event, and the subscription information further including a second identity of the exposure node for the reporting on the event for the at least one second network domain;
- responsive to the request, receiving a response from the first network node, wherein the response comprises at least one of: a first confirmation that the event will be reported to the exposure node for the second network domain for the common network exposure and a second confirmation that the event will be reported to the exposure node for the first network domain, wherein the second confirmation omits an indication of the common network exposure; and
- subsequent to receiving the first confirmation, receiving a notification of the event from each of a second network node and a third network node for each of the at least two network domains, respectively.

* * * * *